Figure 1:
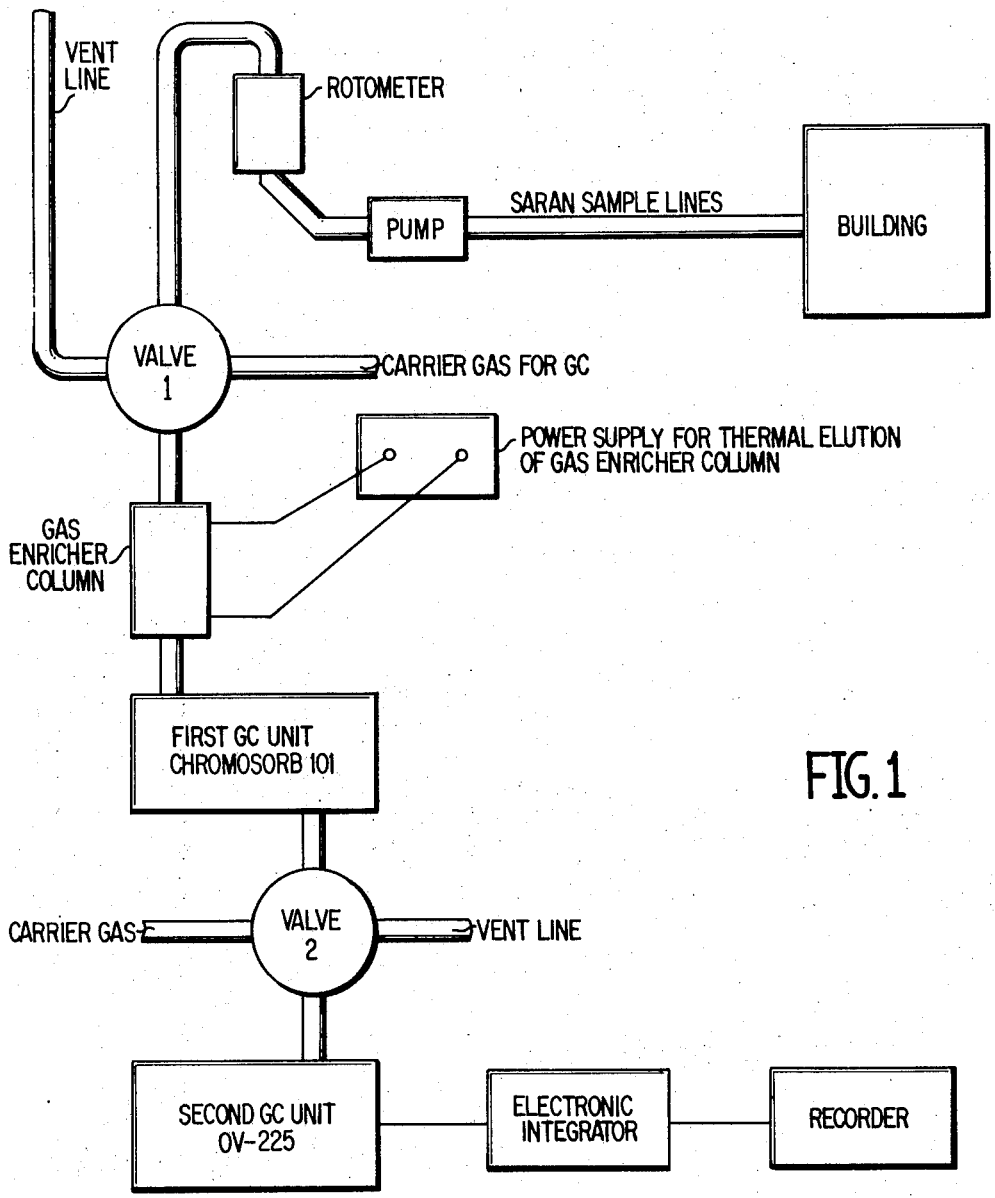

United States Patent [19]
Wilkins et al.

[11] 3,807,217
[45] Apr. 30, 1974

[54] ANALYTICAL MONITORING SYSTEM

[76] Inventors: Raymond L. Wilkins, 233 N. Bellevue Ave., Langhorne, Pa. 19047; Lawrence S. Frankel, 1110 Delene Rd., Jenkintown, Pa. 19046

[22] Filed: Mar. 1, 1972

[21] Appl. No.: 230,710

[52] U.S. Cl.................... 73/23.1, 23/232 C, 55/67, 55/386
[51] Int. Cl. ......................................... G01n 31/06
[58] Field of Search ........ 73/23.1; 23/232 C; 55/67, 55/197, 386

[56] References Cited
UNITED STATES PATENTS
| | | | |
|---|---|---|---|
| 3,514,262 | 5/1970 | Ayers et al........................ | 73/23.1 X |
| 3,547,684 | 12/1970 | Hollis et al....................... | 73/23.1 X |

OTHER PUBLICATIONS
Chemistry, Vol. 37, No. 11, pg. 12–17, Gas Chromatography Snooper Par Excellence, Walter R. Supina et al., November 1964.
Analytical Chemistry, Vol. 30, No. 6, pg. 1157–1158, Programmed Temp. Gas Chromatography, Stephen Nogare et al., June 1958.

*Primary Examiner*—Richard C. Queisser
*Assistant Examiner*—Stephen A. Kreitman

[57] ABSTRACT

An analytical method that can readily and/or continuously detect ultratrace or minute levels of bischloromethyl ether in air is urgently needed because of its high toxicity. A novel gas chromatographic method or system employing a primary adsorber and two analytical columns gated in sequence is disclosed and claimed. Such system is useful in determining and measuring quantities of bischloromethyl ether, as well as other toxic or non-toxic materials, in extremely minute levels, e.g., in the parts per billion (ppb) level, and especially in a background of parts per million (ppm) level of various other components.

10 Claims, 5 Drawing Figures

ANALYTICAL MONITORING SYSTEM

An analytical monitoring system that can be operated in a continuous manner, if desired, is urgently needed to determine and detect minute quantities, for example quantities in the parts per billion level, of bis-chloromethyl ether (hereinafter "bis-CME"). Bis-CME is a common component of chloromethyl ether which is a very widely used industrial as well as a non-industrial chloromethylating agent. Chloromethyl ether is widely used to chloromethylate organic materials, for example, organic aromatic monomeric materials, as well as aromatic polymers which contain units of aromatic monomers. This wide-spread use of chloromethyl ether makes it necessary to have a system that will be able to determine on a continuous basis quantities of bis-CME which may be present in the air in or near operating units in which chloromethylation is taking place. The present invention for the first time provides a method which can, continuously if desired, measure accurately and relatively quickly concentrations of bis-CME down to a level of about 1 to 10 parts per billion (ppb). Moreover, this can be accomplished in a context or background of ppm levels of various other components, at least some of which might or would tend to interfere with the accurate detection and measurement of the bis-CME. Although the invention is disclosed herein as having primary reference to bis-CME, it may also be used for monitoring and analyzing other toxic or non-toxic materials which may be present in the air, as more fully disclosed hereinafter.

Figure 2:
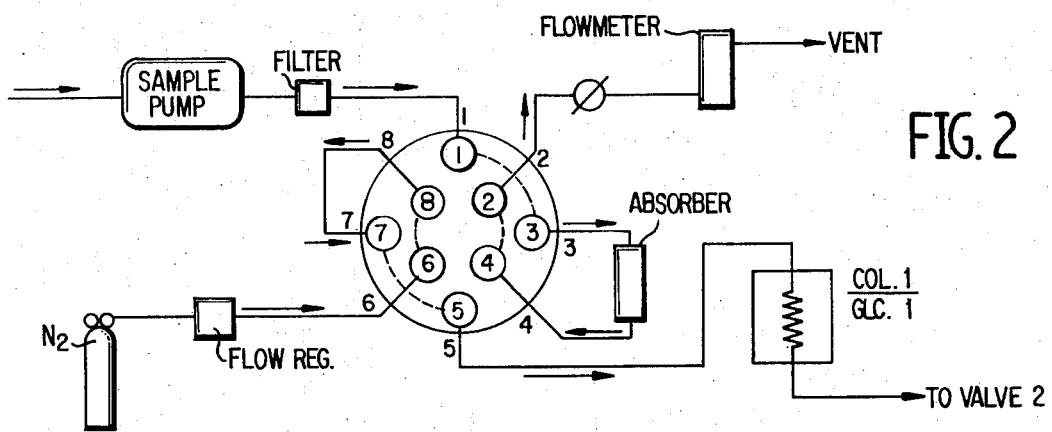
Figure 3:
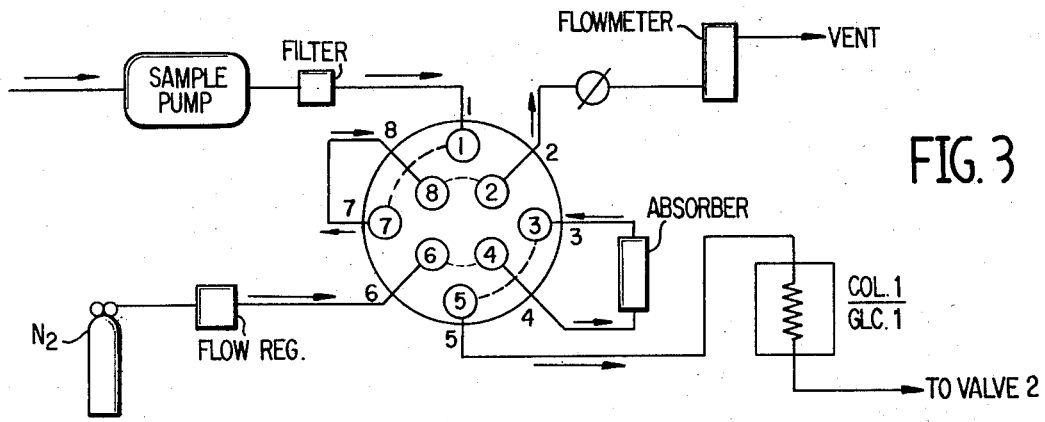
Figure 4:
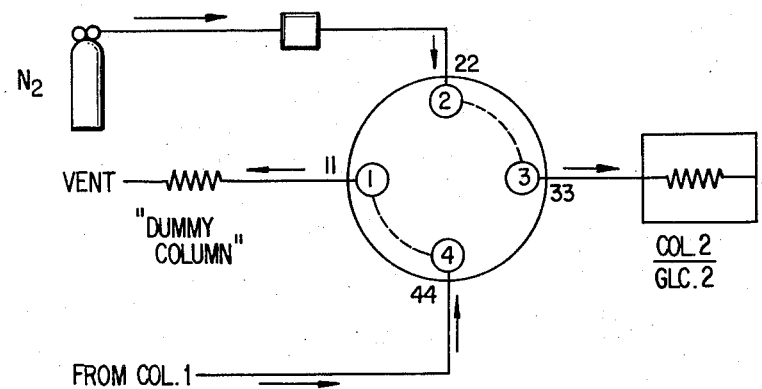
Figure 5:
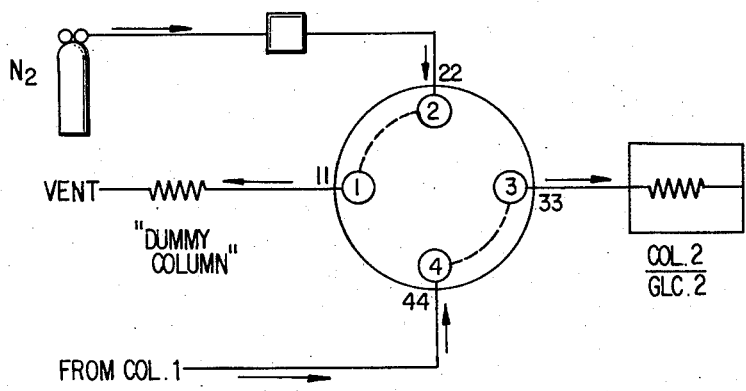

Other advantages and objects of the invention will become apparent upon reading the following detailed discussion and upon reference to the drawings in which: FIG. 1 is a schematic flow diagram showing the arrangement and sequence of the units embodying the present invention; FIG. 2 is a schematic diagram of the valve arrangement and flow arrangement for the sampling procedure; FIG. 3 is a schematic diagram showing the valve arrangement used in transferring and readying the sample for analysis to a second analytical column; FIG. 4 is a schematic flow diagram showing the valve arrangement for discarding the major portion of undesirable or interfering components from a first analytical column prior to transfer of the component or components, to be analyzed, along with those co-eluants or co-elutants which are also transferred to the second analytical column; and FIG. 5 is a schematic flow diagram showing the transfer of the desired components and co-elutants to be analyzed from the first to the second analytical column.

While the invention is susceptible of various modifications and alternative forms, certain specific embodiments thereof are shown by way of example in the drawings and will herein be described in detail. It should be understood, however, that it is not intended to limit the invention to the particular form disclosed, but on the contrary the invention is to cover all modifications, equivalents and alternatives falling within the spirit and scope of the invention as expressed in the appended claims.

With further reference to the drawings, the system operates in the following sequence and manner. As shown more particularly in FIG. 1, a building or other source of air which is to be monitored is connected to a pump by means of a suitable intertubing such as the tubing made from Saran or Teflon. Although the drawings show only a single line it is to be understood that multiple lines can be set up with a switching system arranged to sample at different points in a given building or given area. The air sample to be analyzed is drawn through the rotometer and a valve number 1 to a porous polymer gas primary adsorber which on FIG. 1 is described as a gas enricher column. Although the rotometer is shown on the entrance side of valve number 1, it can also be placed in an alternative spot, for example, on the vent side of valve number 1. In a suitable example, the flow rate of the air to be sampled is set at 1.5 liters per minute and adsorption is carried out for 10 minutes to provide a total volume of same of 15 liters. The adsorber or gas enricher column contains 300 miligrams of a 50 to 80 mesh macroreticular copolymer made from aromatic compounds such as ethylvinylbenzene and/or styrene which is crosslinked with a material such as divinyltenzene (DVB). Such a polymer is available under the trademark Porapak Q. The 50 to 80 mesh and more preferably 80 to 100 mesh particle size gives a good compromise of adsorptive and elution efficiency and pressure drop. If necessary, a more finely divided macroreticular copolymer may be used, for example 80 to 300 mesh size. As shown in the schematic diagram of FIG. 1, the bis-CME, or other component to be analyzed, along with other organic components of the air, is then eluted and carried over to the first gas chromatographic unit analytical column, with the aid of a carrier gas; from the first analytical column the bis-CME and any other material or components which elute nearly or substantially simultaneously with the bis-CME are then transferred to a second GC unit (containing OV-225 on FIG. 1) again with the aid of a suitable gas. However, earlier and later eluters or components are vented out of the system through gate or valve number 2. The components including the bis-CME or other component to be analyzed are then resolved or separated by thermal elution, and with a carrier gas, according to a time temperature program of the second gas chromatographic (GC) unit which in this instance may be referred to as a gas liquid chromatographic (GLC) unit since the column in the second unit contains a packing which has a liquid layer or interface, i.e., a liquid silicone polymer on a solid particulate inert solid. After the second analytical column there is an electronic integrator and recorder in that sequence. Of course, before the electronic integrator (optional) and after the second analytical column there is placed a suitable detector such as a flame ionization detector (not shown on FIG. 1) which is used to detect the resolved component.

As shown in FIG. 2, the air sample is passed through the main or primary adsorber and then to a vent or other exit valve. This is shown more particularly in FIG. 2 wherein a sample air quantity is first filtered to remove particulate material and then enters valve number 1 through port 1 and channel 1–3 then through line 3 to the adsorber and then through line 4 to a channel 4–2 and out through port 2 and line 2 to the vent. While the air sample is being sent through the adsorber the carrier gas, in this instance nitrogen, is constantly passed through both column 1 and analytical column 2. In FIG. 2 this is shown diagrammatically wherein the tank labeled $N_2$ provides nitrogen which enters initially through line 6, channel 6–8, and line 8 and line 7 and then through line 5 to the first analytical column of the first gas chromatographic unit. After the measured sample of gas is collected, nitrogen is backflushed through the adsorber and the adsorber is then heated to about 150°C. for 6 minutes with nitrogen constantly flowing through in a backflushing manner. This thermally elutes or desorbs the enriched components onto the first cold analytical column. The heating also acts as a purge for the adsorber which is then cooled down to ambient temperature so that the adsorber is ready for the next cycle. This procedure is shown in more detail in FIG. 3 wherein the carrier gas, nitrogen, is passed through line 6 and channel 6–4 of valve number 1 to line 4, then through line 4 through the adsorber then through channel 3–5 and then through port 5 and line 5 to and through the first analytical column.

The first analytical column is a gas chromatographic column which contains a packing of Chromosorb 101. The column is approximately 6 feet long and has a ⅛ inch outside diameter. In this procedure the components of the adsorber are transferred from the adsorber with the aid of a carrier gas, such as nitrogen, to the cold first analytical column of the first GC unit which initially is at a temperature of 35°C. At this temperature the components from the adsorber are effectively concentrated, trapped and plugged onto the initial or front portion of the first analytical column. This is equivalent to injecting as a plug. The analytical column of the first gas chromatographic (GC) unit (erroneously labeled as GLC No. 1 in FIGS. 2 and 3) is programmed to rise from 35°C. to 150°C. at a rate of about 12°C. per minute then heated at the rate noted above, i.e., 12°C. per minute. This bis-CME (and any other co-elutants) elutes between 12.0 and 13.5 minutes. Ethylenedichloride (EDC) elutes prior to this gate or time period while toluene elutes after this gate. During the critical gate time interval, valve number 2 is switched to allow access to a second cold analytical column which is initially set at a temperature of about 35°C. Thus the components eluting during the critical gate period are plugged onto the second GLC analytical column. As noted above, the major portion i.e., substantially all of the other components such as ehtylenedichloride or methylal or other components are vented prior to or after the critical gate period through a dummy column as shown in FIG. 4. Toluene, another major component is vented out at about 15 to 16 minutes, i.e., after the critical gate period for the bis-CME. As shown in FIG. 5 during the critical gate period the bis-CME (and co-elutants from the first column) is plugged onto the second analytical column. The second GC analytical column is approximately 12 feet long and is packed with 7% OV-225 on a solid inert support. (The packing contains a liquid silicone polymer (7% OV-225) on silanized 80 to 100 mesh Gas Chrom Q.) The second GC unit, which is shown in FIGS. 4 and 5, is described as a GLC unit or gas liquid chromatographic unit because it contains a liquid silicone polymer on a solid support. The second GC (or GLC) unit is programmed from 35° to 120°C. at a rate of about 15°C. per minute and nitrogen is flushed through the system as a carrier gas. The bis-CME elutes in 6.1 minutes through 6.3 minutes. Primarily, any remaining ethylenedichloride elutes before the bis-CME and toluene elutes after the bis-CME in the second column. Thus, the second column resolves and separates or discriminates the bis-CME, in accordance with a time temperature program, from those components which were, at least in part, co-eluters in or from the first column. A flame ionization detector is then utilized optionally in conjunction with an electronic integrator and a recorder to give a continuous read out and print out of the detector response to bis-CME against time. The second analytical column is thereafter purged clean at a higher temperature, i.e., above 150°C., then cooled backed down to room temperature. Both units are thereafter ready for the next run.

The dual column GC units have been studied at difference sites and different areas and buildings for an extended period of time. The system or apparatus has been found to give no false alarms and it has sufficient selectivity to analyze for bis-CME in an industrial or other environment minute levels including down to a 10 ppb level or lower. The dual column GC system may be considered to include three major parts or steps:

1. sample collection by an adsorber, perferably at ambient temperature, containing a macroreticular copolymer and thermal elution onto a first cold GC analytical column;

2. operation of the first GC analytical column which includes a gate for the bis-CME and co-eluants or co-elutants; and 3. the operation of the second GC analytical column including elution and detection of bis-CME by a suitable detector. This system also includes, of course, suitable purges (150°C. or higher) for the first and second columns as well as a purge for the gas enirhcer column or adsorber.

In more detailed fashion, the monitoring system comprises:

a. a means of sequentially collecting air samples usually from remote locations up to the order of 200 feet or more;

b. concentrating the organic components on a suitable adsorer comprising the primary or first adsorber;

c. desorbing or eluting thermally from adsorber the organic components into the analytical column of a gas chromatographic (GC) apparatus;

d. isolating the desired component to be analyzed along with other components which elute nearly simultaneously onto a second chromatographic column which is usually a gas liquid chromatographic column (GLC). This is carried out by a thermal desorption with the aid of a carrier gas. Those components which elute substantially simultaneously with the desired component to be analyzed may be termed co-elutants or co-eluants. This procedure is accomplished by a gating or valving system which automatically vents both earlier and later eluters out of this system. The phrase earlier and later eluter refers to those which come before the desired component and those which come after the desired component which is being analyzed;

e. finally separating the desired component from all others by temperature programming of the second GLC column.

The time necessary to complete the above steps is approximately 20 minutes for the sample collection and elution onto the first GC analytical column, 30 minutes for operation of the first analytical column including the gate for the bis-CME and 20 minutes for elution and detection of the bis-CME in or after the second GC unit. The system can produce two data points per hour or 48 data points per day. The system can be also carried out in a continuous manner and a suitable sampling procedure can utilize any multiple sample selector valve. For example, each sample line can be connected to this valve which can basically operate in such a manner that one sample line is attached to the analytical gas chromatographic system while the others are closed to this system. Each sample line can then be analyzed six times a day. Optionally, each line can have its own adsorber and the multiple selector valve can be sequentially connected to the outputs of those adsorbers.

The porous macroreticular aromatic copolymer which is used in a finally divided condition and which is used in the first or primary adsorber or gas enricher column is a known material and is essentially a non-ionogenic water insoluble crosslinked polymer usually of styrene, ethylvinylbenzene or the like and an aromatic crosslinker such as divinylbenzene, trivinylbenzene, etc. The composition and methods of making these macroreticular copolymers is disclosed more fully in U. S. Pat. No. 3,531,463, the disclosure of which is incorporated herein by reference.

With further reference to the polymeric adsorbent which is used in the primary adsorber or gas enricher column, it is recommended that the adsorbent have a relatively large surface area and a relatively small average pore diameter. For example, the Porapak Q which is used in the adsorber has a surface area of about 840 square meters per gram and an average pore diameter of about 75 A. It is preferred that the polymeric adsorbent which is used in the first analytical column has a somewhat smaller surface area and a somewhat larger average pore diameter. For example, the Chromosorb 101 used in the first analytical column has a surface area of about 30 to 40 square meters per gram and an average pore diameter of about 3,500 A units. It is preferred that in the second analytical column there is used an adsorbent in the column, i.e., the column is packed with a particulate inert solid containing a thin liquid polymeric layer such as is available under the trademark OV-225, which is an adsorbent containing a methyl silicone polymer on an inert particulate support. As can be seen from the above description, it is preferred that the adsorbent used in the primary adsorber have a relatively large surface area in order to insure sufficient capacity for the component or components to be analyzed. On the other hand, the capacity can be lower for the first analytical column whereas the rate of adsorption and desorption should be faster and for this reason a smaller surface area and larger pore size polymer is used. The primary adsorber or the first analytical column both contain, in the usual case, a polymeric aromatic adsorbent which is hydrophobic in nature. This permits the relatively easy passage of polar type materials such as water and acids and methylal to go through the system without interfering with the organic components to be analyzed. On the other hand, the present invention can work quite adequately where the adsorption of a polar component would be desired and it would be desirable to reject the non-polar components. In this instance, one could use an aliphatic polymeric adsorbent of the type disclosed in claims in Albright, U. S. application Ser. No. 846,271, assigned to a common assignee, now U. S. Pat. No. 3,663,467.

Although the invention has been described with primary reference to bis-CME, it may also be used to measure and determine minute or ultratrace quantities of other materials which may or may not be toxic. Examples of such other materials and their recommended threshold limiting values as published by the American Conference of Governmental Industrial Hygienists are shown in the table below.

|  | PPM |
| --- | --- |
| Bromine | 0.1 |
| Bromoform | 0.5 |
| Chlorine dioxide | 0.1 |
| Chloropicorin | 0.1 |
| Diazomethane | 0.2 |
| Diborane | 0.1 |
| Ethylene glycol dinitrate | 0.2 |
| Ethylene imine | 0.5 |
| Fluorine | 0.1 |
| $H_2Se$ | 0.005 |
| Iodine | 0.1 |
| Ketene | 0.5 |
| Methyl isocyanate | 0.02 |
| Monomethyl hydrazine | 0.2 |
| Nickel carbonyl | 0.001 |
| Ozone | 0.1 |
| Pentaborane | 0.005 |
| Phosgene | 0.1 |
| Phosphine | 0.3 |
| Quinone | 0.1 |
| Stilbine | 0.1 |
| Sulfur pentafluoride | 0.025 |
| Tellurium hexafluoride | 0.02 |
| Toluene 2,4 diisocyanate | 0.02 |

While the above description of the invention discloses the use of a flame ionization detector, it is understood that other detectors could be used such as, for example, electron capture devices, flame photometric units, and coulometric units, etc.

As stated hereinbefore, although the invention has been described with particular reference to the problem of bis-CME which is reported to be a carcinogenic toxicant, see the article by F. Laskin et al., Arch. Environ. Health 23 (8), 135 (1971), the invention also has application to a more general situation. That is to say, the present analytical detection system is particularly useful for detecting levels of toxic or non-toxic components at the parts per billion level (ppb), in a background environment of other components which are present in the parts per million (ppm) level.

Thus, if one were monitoring and analyzing for a given component, say component A which is present in a sample in minute quantities in the ppb level, in a background of components B, C, D, E, etc., some of which are present in the ppm or greater level, the present system is adapted to analyze for component A. By appropriate selection of the adsorbent for the primary adsorber, component A along with one or more of the other components B, C, D, and E, etc. would first be adsorbed by the adsorber; these components would then be eluted onto the analytical column of the first GC unit; thereafter in accordance with a suitable time temperature program one or more of the components say B or C etc. would be vented away and the desired component A would then be plugged on to the second analytical column along with any co-elutants say D and E. With an appropriate time and temperature program the second column would then be eluted so as to space out the elution of the components A, D and E and at the appropriate time the output signal from a flame ionization or other detector would be made read and the presence of the component A to be analyzed, and optionally with the aid of a conventional integrater, the amount of A could be determined.

It should be unerstood that the time temperature program for the operation of the first and second gas chromatographic units can vary widely depending on the component or components that are being analyzed and the invention is not limited to any specific temperature or time temperature program. Also, the present invention is not limited to the analysis of toxic materials, per se. Thus the present invention could be used to analyze non-toxic components which might be an undesirable by-product of some chemical process operation.

Within the context of the present invention, it may also be desirable under certain circumstances to omit the first adsorber or primary adsorber column and to operate the unit with the first and second analytical units with the gating system alone.

What is claimed is:

1. In a gas chromatographic method for monitoring and analyzing air samples from an industrial or other environment for the presence of bis-chloromethyl ether present in said environment in minute quantities along with components which tend to interfere with the accurate analysis of said bis-chloromethyl ether, the improvement which comprises adsorbing in a thermally reversible or thermally desorbable adsorber comprising a finely divided macroreticular porous copolymer adsorbent the bis-CME and at least one of the other components from a measured air sample at a first temperature, thermally eluting or desorbing at a higher temperature the elutant comprising the bis-CME and said other components from the porous copolymer adsorbent and transferring the elutant from the adsorber with the aid of a carrier gas to a first cold analytical column of a gas chromatographic unit, heating said first analytical column in accordance with a time-temperature program and venting or removing a major portion of the interferent components so as to prevent their transmission to the second analytical column, transferring the bis-CME and any co-elutants with the aid of a carrier gas to a second cold analytical column of a gas chromatographic unit, then heating the second analytical column in accordance with a time-temperature program to substantially resolve the co-elutants from the bis-CME and thereafter detecting the bis-CME eluted from said second analytical column.

2. Method according to claim 1 wherein air samples are continuously provided and the monitoring and analyzing is carried on in a continuous manner.

3. Method according to claim 2 wherein the macroreticular porous copolymer adsorbent is an aromatic crosslinked copolymer.

4. Method according to claim 3 wherein the bis-CME and the other component or components are adsorbed at ambient temperature and eluted at a temperature of about 150°C.

5. Method according to claim 4 wherein the initial temperature of the first and second analytical column is about 35°C. and the temperature of each is raised to a maximum of about 150°C. at a predetermined rate of at least about 10° to 12°C. per minute.

6. Method according to claim 5 wherein a carrier gas is used to transfer the bis-CME and/or other components from the macroreticular copolymer adsorbent to the first analytical column, from the first analytical column through a gating system to a second analytical column, and from the second analytical column to a measuring detector.

7. Method according to claim 5 wherein the components, as well as the bis-CME, are organic in nature.

8. In a gas chromatographic method for monitoring and analyzing air samples from an industrial or other environment containing a component A present therein in minute quantities on the order of a ppb level along with other components at least some of which are present in the ppm level, the improvement which comprises adsorbing component A and the other components in a primary adsorber at ambient temperature, said primary adsorber being thermally desorbable, thermally eluting component A and the other components and transferring them with the aid of a carrier gas to a first analytical column of a gas chromatographic unit, heating in accordance with a time temperature program, said first column and by means of a gating system, venting or removing a major portion of the other components then transferring component A and minor portions of co-elutants with the aid of a carrier gas to a second analytical column comprising a gas liquid chromatographic column of a gas chromatographic unit, then heating the second column in accordance with a time temperature program to substantially resolve the co-elutants from component A, and thereafter detecting and measuring the amount of component A.

9. In a gas chromatographic system for continuously monitoring and analyzing air samples for a component A present in minute quantities along with other components, wherein the improvement comprises means for transferring the air sample to an adsorber unit, which is thermally reversible or thermally desorbable, heating means for said adsorber unit, a first analytical gas chromatographic column with time-temperature programmed heating means, a second analytical gas chromatographic column with time-temperature programmed heating means, means for transferring component A and co-elutants at a predetermined time from the first analytical column to a second analytical column including means for preventing the transfer from the first to the second column of at least some of the other components which tend to interfere with the detection and/or analysis of component A, means for resolving the gaseous sample in the second column and eluting the elutants including component A at their respective elution times from the second column, detecting means and means for determining the amount of component A which is present in the air sample.

10. In a gas chromatographic system for continuously monitoring and analyzing air samples for bis-CME, the combination comprising a source for the air samples, means for transferring the air sample to an adsorber unit, which is thermally reversible or thermally desorbable, heating means for said adsorber unit, first analytical gas chromatographic column with time-temperature programmed heating means, a second analytical gas chromatographic column with time-temperature programmed heating means, means for transferring the concentrated gaseous sample of the bis-CME and any co-elutants at a predetermined time from the first analytical column to a second analytical column including means for preventing the transfer of interfering components from the first to the second column and eluting the elutants including the bis-CME at their respective elution times from the second column, detecting means for the bis-CME, and means for determining the amounts of bis-CME which is present in the air sample.

* * * * *

UNITED STATES PATENT OFFICE
CERTIFICATE OF CORRECTION

Patent No. 3,807,217            Dated April 30, 1974

Inventor(s) Raymond L. Wilkins and Lawrence S. Frankel

It is certified that error appears in the above-identified patent and that said Letters Patent are hereby corrected as shown below:

IN THE SPECIFICATION:

Col. 2, line 18, "divinyltenzene" should read --divinylbenzene-- .

Col. 4, line 7, "backed" should read --back-- .

Col. 4, line 28, "enirhcer" should read --enricher-- .

Col. 6, line 64, "unerstood" should read --understood-- .

Col. 4, line 37, "adsorer" should read -- adsorber --.

Signed and sealed this 29th day of October 1974.

(SEAL)
Attest:

McCOY M. GIBSON JR.
Attesting Officer

C. MARSHALL DANN
Commissioner of Patents